Oct. 13, 1970   W. H. NEUBECK, JR   3,533,545
UNLOADING APPARATUS FOR STRANDS OF MEAT PRODUCTS
Filed Jan. 13, 1969   5 Sheets-Sheet 1

Inventor
William H. Neubeck, Jr.
by
Atty's

Oct. 13, 1970  W. H. NEUBECK, JR  3,533,545
UNLOADING APPARATUS FOR STRANDS OF MEAT PRODUCTS
Filed Jan. 13, 1969  5 Sheets-Sheet 5

United States Patent Office 3,533,545
Patented Oct. 13, 1970

3,533,545
UNLOADING APPARATUS FOR STRANDS
OF MEAT PRODUCTS
William H. Neubeck, Jr., Justice, Ill., assignor to Julian
Engineering Company, Chicago, Ill., a corporation of
Illinois
Filed Jan. 13, 1969, Ser. No. 790,541
Int. Cl. B65h 17/42
U.S. Cl. 226—105                                    32 Claims

ABSTRACT OF THE DISCLOSURE

Strands of linked sausages or other product may be removed from their end supported hangers, and the hangers may be thereafter removed from the hanger conveyor by means including one mechanism which disengages the hanger member at one end thereby permitting the hanger to swing downwardly and the product to fall therefrom and another mechanism which then disengages the other end of the hanger from the conveyor and transports the hanger to a location remote from the conveyor.

BACKGROUND OF THE INVENTION

This invention relates to an apparatus for conveying a product strand along a predetermined path on hanger members supported on a conveyor, and more particularly to an improved mechanism for unloading the product from the hanger members and for removing the hanger members from the conveyor.

The invention is particularly adapted for use in the processing of "skinless" weiners and link sausages where it is conventional for the linked sausage strands to be hung on horizontal bars or hangers known as "smoke sticks." The smoke sticks are supported at their ends on racks or other conveying mechanism for transporting either continuously or in batches to the various processing chambers, including, for example, a coagulant spray chamber, a cooking and smoking chamber, a water cooling chamber and a deluge brine chill chamber. After the deluge brine chill operation, the sausage strands are unloaded from the hangers, the casing is stripped from the sausages, and the sausages are packaged. The present invention is directed to the mechanisms and apparatus for facilitating and automating the hanger unloading operation.

The invention may be described in connection with a sausage conveying mechanism, but it will be understood that the invention may be employed to advantage in connection with mechanisms for conveying strands of other types of material, including other types of food products.

In recent years there has been an increasing demand from meat packers for equipment to automatically handle the processing of sausages, and to this end there have been devised various mechanisms including automatic stuffers and linkers and automatic loaders and conveyors. Prior to this invention, however, there had not been devised a satisfactory means for unloading the looped strands of sausages from smoke stick hangers at the discharge end of the stick conveyor and for removing the sticks from the conveyor in such a way that they would not be apt to fall upon and damage the sausage strands which had just been discharged therefrom.

The object of this invention is to provide an improved means for first unloading strands of a product from the smoke sticks or hangers and for then removing the hangers from the conveyors. The apparatus permits the automatic discharge of the product at the end of the conveyor run, and after the product has been discharged, the hanger or smoke stick is gripped, removed from the conveyor, and then transported to and discharged in a location remote from the conveyor.

SUMMARY OF THE INVENTION

The present invention is an improvement in an apparatus having a conveyor including a pair of spaced parallel conveyor members for transporting a plurality of elongated transversely-extending hanger members along a predetermined path. The hanger members are each adapted to support a product strand, such as a strand of linked sausages, which has been draped or looped thereover and depends therefrom. In accordance with one embodiment of the invention, the improvement includes means for releasably connecting one end of each of the hanger members to the first of the conveyor members and releasably and pivotally connecting the other end of each of the hanger members to the other or second of the conveyor members. It is preferred that these connections both be pin and aperture connections, with the pins being carried by the conveyor members and the ends of the hanger members being apertured to receive these pins.

A first disengaging means is provided for disengaging each hanger member from the first conveyor member as the hanger member reaches a predetermined location. The hanger member will remain connected to the second conveyor member and will swing downwardly from a substantially horizontal position to a substantially vertical position, permitting the product to fall therefrom. A second disengaging means disengages the hanger member from the second of the conveyor members after the product strands have fallen free and the hanger member has reached its substantially vertical position.

The first disengaging means preferably includes an element movable into engagement with the end of the hanger member adjacent the first conveyor member to knock the hanger member off of the end of the first conveyor member supporting pin as that pin is moved from a substantially vertical position and approaches a substantially horizontal position at the discharge end of the machine. Since the pin on the second conveyor member remains in engagement with the hanger member, and this pin also approaches a horizontal position, the hanger member will swing downwardly substantially about the axis of this second conveyor member pin. As the hanger swings downwardly the product strands are free to fall off the free end of the hanger.

The second disengaging means preferably includes a pair of jaws for gripping the substantially vertical hanger member and means for moving the jaws in a first direction to effect disengagement of the hanger member from the pin of the second conveyor member and thereafter in a second direction to transport the gripped hanger member to a desired position away from the conveyor.

It is preferred that there be a product pushing means for forcing the product on the hanger members away from the second conveyor member and toward the first conveyor member prior to the disengagement of the hanger member from the first conveyor. This assures quick release of the product from the hanger member and prevents damage to the product during discharge. The sausage strands tend to become cemented to the hanger members during processing, and if they are not first dislodged, the strands may swing with the hanger member away from the first conveyor member and be hurled against the side of the apparatus adjacent the second conveyor member. The product pushing means thus prevents damage to the product by preventing the product from being thrown against the side of the machine as it is being discharged from the hanger members.

BRIEF DESCRIPTION OF THE DRAWINGS

With reference to the figures.

DESCRIPTION OF THE PREFERRED EMBODIMENTS

Figure 1:
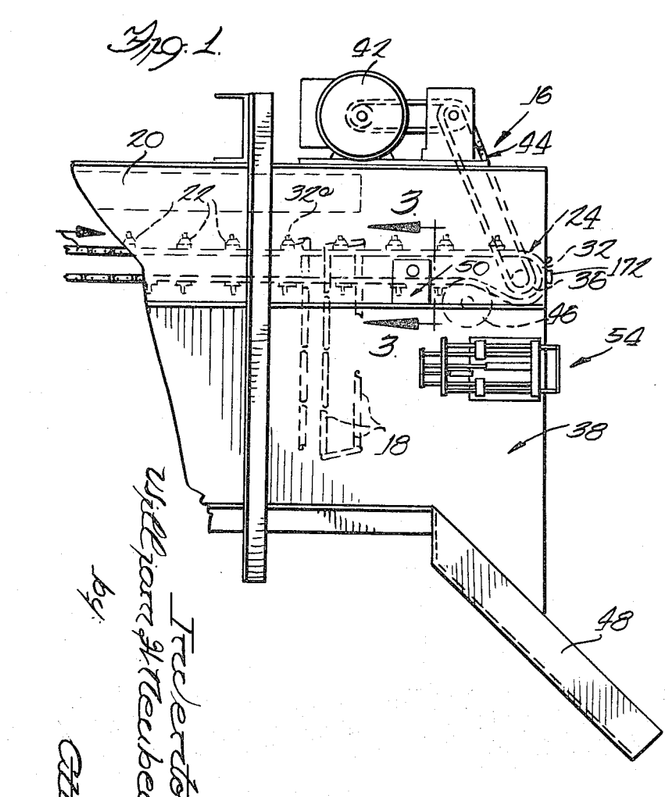
FIG. 1 is a side elevational view of the discharge end of an apparatus for processing sausages and embodying mechanisms constructed in accordance with this invention.
Figure 2:
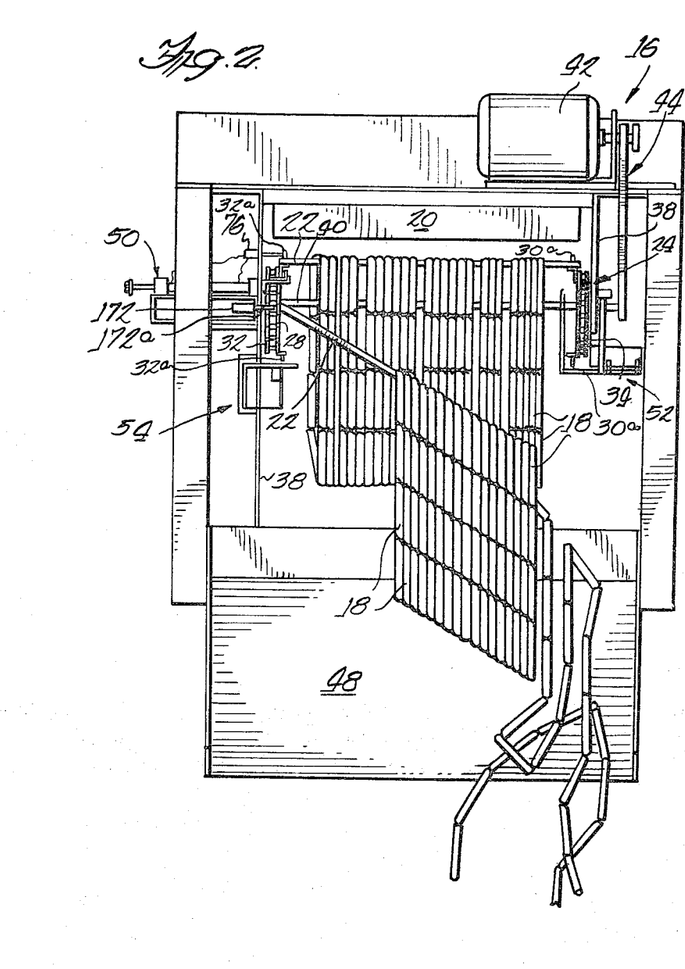
FIG. 2 is an end elevational view of the apparatus illustrated in FIG. 1 showing the manner in which the product is discharged from the hanger members.

In FIGS. 1 and 2 there is shown the discharge end of an apparatus or machine 16 adapted to convey strands 18 of linked sausages or the like through a series of processing chambers including a deluge brine chill chamber 20 adjacent the discharge end of the machine. The encased linked sausage strands 18 are conveyed through the apparatus 16 on barlike hanger members 22 known as "smoke sticks." The strands of linked sausages are looped onto the smoke sticks or hanger members 22 adjacent the forward or charge end of the apparatus 16 (not shown), and the loaded hanger members are then placed on the conveyor 24 for transporting through the apparatus.

The conveyor 24 includes a pair of chain conveyor members 26 and 28. For convenience of description, portions of the apparatus 16 will be described as left or right, as the case may be, looking in the direction in which the conveyor 24 is moving as indicated by the arrow at the extreme left hand side of FIG. 1. Thus, the conveyor member 26 is the first or left hand conveyor member, and conveyor member 28 is the second or right hand conveyor member.

Figures 4, 5:
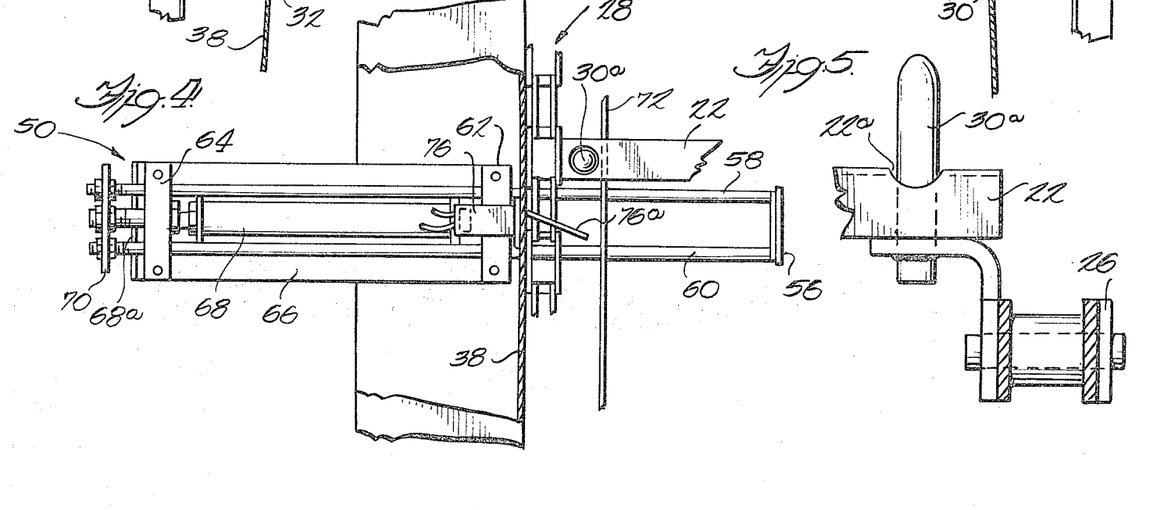
FIG. 4 is an enlarged top plan view of the product pushing mechanism.
FIG. 5 is an enlarged end view of a portion of one of the hanger members and a portion of one of the conveyor members showing the pin and aperture connection therebetween.

The left hand conveyor member 26 includes an endless chain 30, the links of which support a plurality of uniformly spaced pins 30a that extend radially outward from the periphery of the chain 30. The right hand or second conveyor member 28 has a similar endless chain 32 having uniformly spaced pins 32a extending radially outwardly from its periphery. Each of the hanger members 22 is provided with pin receiving apertures 22a adjacent its opposite ends. The conveyor pins 30a and 32a extend through the respective end apertures 22a in the hanger members 22, and the hanger members thus extend between and are removably connected to the conveyor members. The connection is best shown in FIG. 5.

The endless chains 30 and 32 extend around a pair of end sprockets 34 and 36 respectively. The sprockets 34 and 36 are mounted on and keyed for rotation with an axle or shaft 40 journaled in the frame 38 of the apparatus 16. The left hand end of the shaft 40 is driven by means of a motor 42 through a belt drive apparatus 44. Since the sprockets 34 and 36 are affixed to the same shaft 40, they are driven in unison, and the chains 30 and 32 which they carry are also driven in unison or at the same speed. The pins 30a and 32a carried on the two chains are thus maintained in transverse alignment. If desired, a tensioning idler sprocket 46 may be employed for each of the chains 30 and 32, this sprocket being illustrated in FIG. 1.

At the discharge end of the apparatus 16 is a product chute 48 into which the looped strands of linked sausages 18 are to be discharged. The hanger members 22 are also to be removed at the discharge end of the machine, and in order to prevent damage to the strands of linked sausages 18, it is highly desirable that the sticks be moved away from the chute 48 so that they will not fall into the same chute or area as the sausage strands. In order to accomplish the discharge of the sausage strands 18 and the removal of the sticks 22 at the discharge end of the apparatus 16, a plurality of cooperating mechanisms are provided. The first of these mechanisms is a pusher mechanism 50 for forcing the linked sausage strands 18 hanging on the hanger members 22 away from the second or right hand conveyor member 28 and toward the first or left hand conveyor member 26. This not only loosens the strands which may have become cemented to the hangers, but it positions the strands for discharge, as will be hereinafter more fully described. The pusher mechanism 50, which is disposed inwardly or upstream from the discharge end of the apparatus 16, is schematically illustrated in FIGS. 1 and 2 and is illustrated in detail in FIGS. 3 and 4.

At the discharge end of the apparatus 16, the conveyor chains 30 and 32 travel about the sprockets 34 and 36, respectively, causing the pins 30a and 32a to change their angle of disposition, and swing from a vertically upstanding position through a forwardly extending horizontal position and then into a vertically downward position in the return run of the chain. As each pair of aligned pins on the conveyor chains 30 and 32 moves from its vertically upstanding position toward its horizontal position, a first disengaging mechanism 52 is actuated to effect disengagement of the left hand end of the hanger member 22 from the pin 30a carried on the chain 30. This mechanism is schematically illustrated in FIGS. 1 and 2 and illustrated in detail in FIGS. 6, 7, 8 and 9.

With its one end disengaged from the conveyor the hanger member 22 swings downwardly to discharge the strands 18 into the product chute 48 as illustrated in FIG. 2. When the hanger member 22 reaches a substantially vertical position, a mechanism 54 grips the hanger member, disengages it from the right hand conveyor member 28, and transports it to a location remote from this conveyor member and from the chute 48. The mechanism 54 is illustrated schematically in FIGS. 1 and 2 and is shown in detail in FIGS. 10 and 11.

Figure 3:
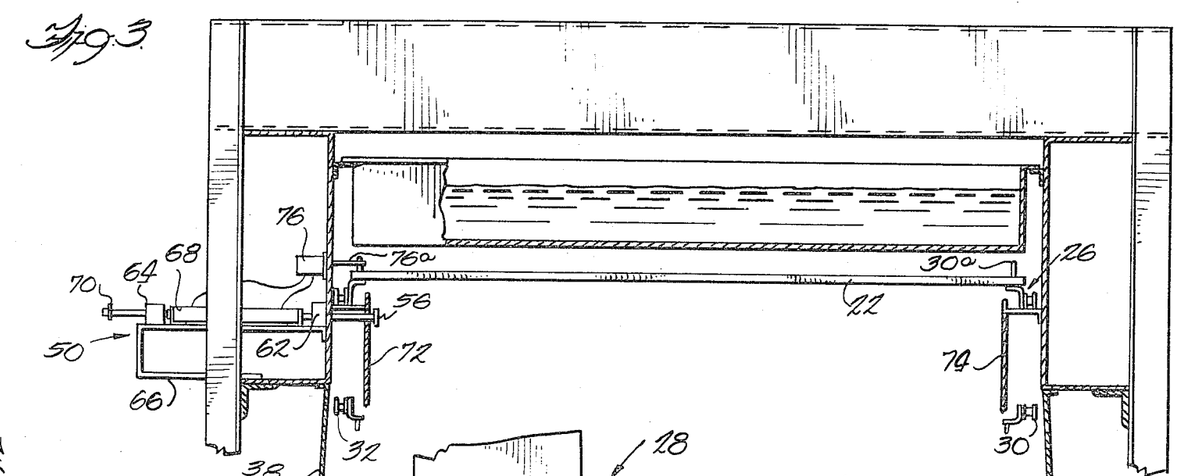
FIG. 3 is an enlarged sectional view of a portion of the apparatus taken substantially along line 3—3 of FIG. 1 and showing the mechanism for pushing the product to one side prior to discharge.

The pusher mechanism 50 for forcing the product strands 18 on the hanger member 22 away from the right hand conveyor member 28 toward the left hand conveyor member 26 is best illustrated in FIGS. 3 and 4. This mechanism 50 includes a product-engaging plate 56 having a pair of parallel operating rods 58 and 60 which are mounted for sliding movement in a pair of guide blocks 62 and 64 affixed to a support 66 on the frame 38 of the apparatus. Also affixed to the support 66 is a fluid cylinder 68 having an operating piston 68a which extends through the rearward guide block 64 and is connected to the operating rods 58 and 60 by means of a connecting plate 70.

The pusher mechanism 50 is mounted adjacent the right hand conveyor member chain 32, just below the level of the path of the hangers 22. Also below the path of the hangers 22 is a sheet metal shield 72 which protects the product from engagement with the return run of the endless chain 32. A second sheet metal shield 74 similarly protects the product from engagement with the return run of the endless chain 30. The product-engaging plate 56 is disposed inwardly from the shield 72, and the operating rods 58 and 60 extend through the shield.

In its retracted position the plate 56 is substantially in juxtaposed position with respect to the shield 72 as illustrated in FIG. 3, and when the mechanism is actuated it moves to its extended position as illustrated in FIG. 4 where the plate 56 is disposed well inwardly of the shield 72. This forces the product to the left, looking in the direction in which the conveyor 24 is moving, or to the right as viewed in FIGS. 3 and 4. The pusher mechanism 50 may be actuated by means of a solenoid valve 76 having an operating switch 76a which is disposed in the path of and is engaged by the pins 32a on the conveyor chain 32.

The pusher mechanism 50 is intended to accomplish two results, namely, (1) to loosen the sausage strands from the hangers to which they may have become cemented during processing, and (2) to position the strands away from the side of the machine 16 toward which the hanger members swing in their discharging of the product. The sausage strands 18 may be discharged cleanly from the hanger members 22 and will not be hurled against the side of the machine.

Figures 6, 7, 8, 9, 10:
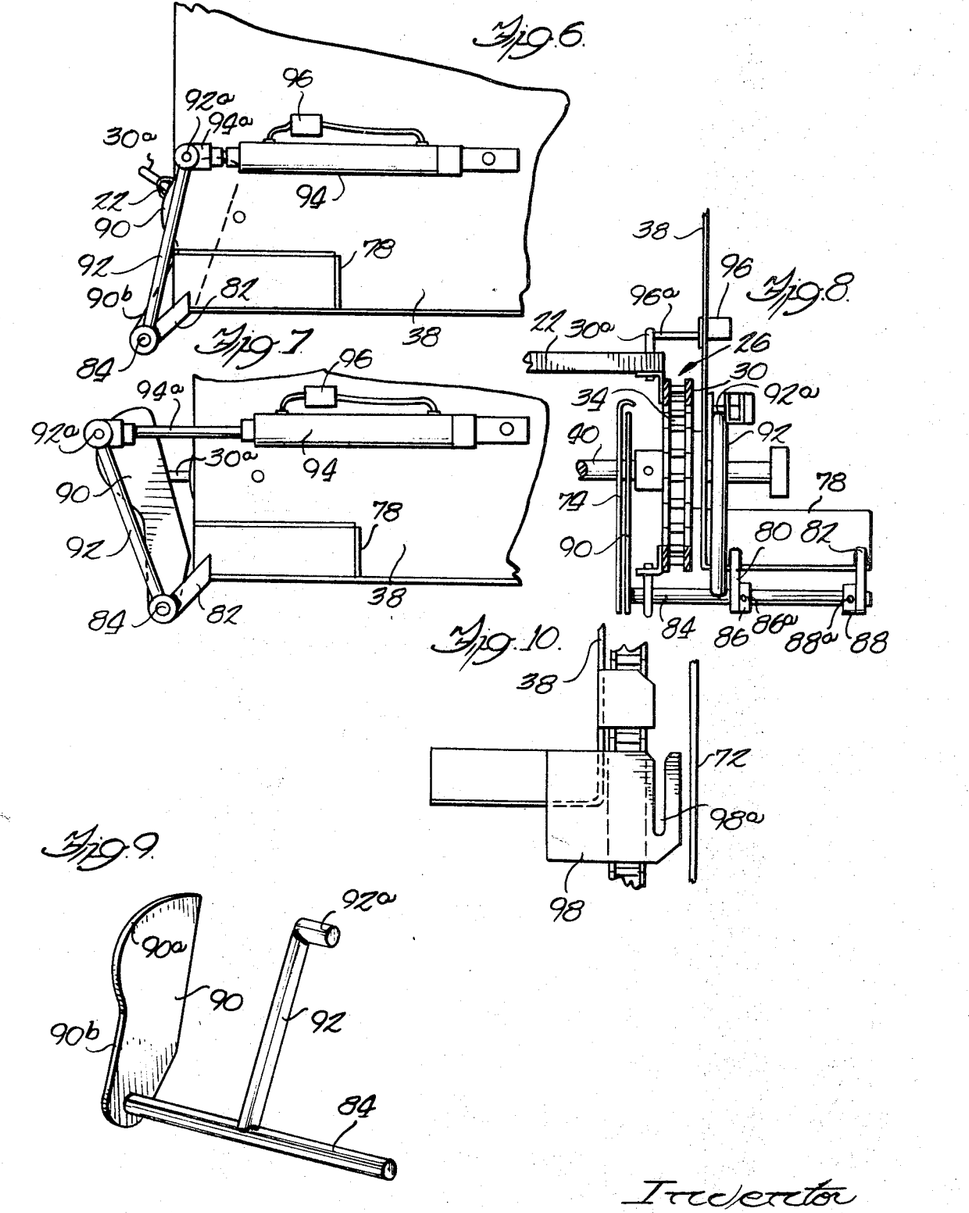
FIG. 6 is a side elevational view of the first disengaging mechanism, the mechanism being shown in a retracted position prior to movement to effect disengagement of a hanger member from the first conveyor member.
FIG. 7 is a side elevational view of the mechanism illustrated in FIG. 6 showing the position of the mechanism just after it has been moved to effect disengagement of a hanger member from the first conveyor member.
FIG. 8 is an end elevational view of the portion of the apparatus showing the mechanism of FIG. 6.
FIG. 9 is a perspective view of the hanger member engaging portion of the mechanism illustrated in FIG. 6.
FIG. 10 is an end elevation of a portion of the apparatus showing one form of mechanism for disengaging the hanger from the second conveyor member.

The first disengaging mechanism 52, which is a mechanism for disengaging the left hand end of each hanger member 22 from its pin 30a on the left endless chain 30, is shown in FIGS. 6, 7, 8 and 9. Attached to the frame 38 of the apparatus is a support 78, and extending outwardly and downwardly from this support is a pair of spaced parallel arms 80 and 82. The lower ends of these arms are apertured, and a horizontal shaft 84 is journaled therein, being held in place by a pair of locking collars 86 and 88 releasably attached to the shaft 84 by means of set screws 86a and 88a respectively. Thus the shaft 84 is free to rotate relative to the arms 80 and 82 about its horizontal axis. It will be noted that the shaft 84 extends forwardly of and is disposed slightly below the axis of the sprocket shaft 40 as best illustrated in FIGS. 6 and 7.

The inner end of the shaft 84 extends inwardly to the space between the frame 38 and the sheet metal shield or guard 74, and a vertical plate 90 affixed to the inner end of the shaft 84 is adapted to rotate with the shaft about the axis of the shaft. The leading edge of the upper or free end portion 90a of the plate 90 is convex, whereas the leading edge of the lower end portion 90b of the plate is straight. Also affixed to the shaft 84 is an operating arm 92, the free end 92a of which is connected to the piston arm 94a of a fluid cylinder 94. The fluid cylinder 94 is attached to the frame 38 of the apparatus. The fluid cylinder 94 is operated by means of a solenoid valve 96 having a switching arm 96a adapted to engage the pins 30a on the chain 30 of the conveyor. In its normal position the piston arm 94a of the fluid cylinder 94 is retracted, and the hanger-engaging plate 90 is also retracted as illustrated in FIG. 6.

As one of the pins 30a on the chain 30 approaches a predetermined position of approximately 30–45° up from the horizontal, one of the pins 30a, which may or may not be the pin holding the particular hanger member being disengaged at the time, hits the switch arm 96a of the solenoid valve 96 to actuate the fluid cylinder 94 and move the piston 94a of that cylinder from its retracted position illustrated in FIG. 6 to its extended position illustrated in FIG. 7. This rotates the operating arm 92 and the shaft 84 carrying the plate 90 to the position illustrated in FIG. 7. In this movement the concave upper end 90a of the plate 90 engages the end of the hanger member 22 and cams it off of its pin 30a, permitting it to swing downwardly about the axis of the pin 32a on the right hand chain 32 of the conveyor member 28. As soon as the pin 30a moves out of engagement with the arm 96a of the solenoid valve 96, the fluid cylinder 94 is actuated in the opposite direction to effect movement of the piston arm 94a, the operating arm 92, and the plate 90 to the initial position as illustrated in FIG. 6.

In the retracted position as illustrated in FIG. 6, the upper portion 90a of the plate is completely out of the path of the hanger members 22, but the lower portion 90b is in the path for eventual engagement by hanger members. If for some reason the cylinder 94 should fail to be actuated to extend the upper portion 90a of the plate 90 into engagement with the hanger member 22, the hanger member 22 will, nevertheless, be removed from the first conveyor member 26 because the lower portion 90b of the plate 90 will engage the hanger 22 and strip it from the pin 30a after the hanger member passes its horizontal position.

The hanger members 22 may be disengaged from the conveyor member 28 by means of a disengaging plate 98 mounted in front of the sprocket 36 for the right hand endless chain 32. The plate 98 may have a slot 98a through which the pins 32a of the endless chain may pass in their movement about the sprocket 36 after they have reached a horizontal position. This is best illustrated in FIG. 10. This mechanism would cause the hanger members to disengage themselves from their pins 32a in much the same manner as the lower end 90b of the plate 90 disengages the hangers from the pins 30a after passing the horizontal position. The hangers would then drop into the chute 48, or, if desired, a separate chute could be provided below the plate 98 to receive the hanger members as they are disengaged, thereby separating the hanger members from the product strands 18. Such a plate 98 may serve as a simple back-up or fail-safe means for stripping the hanger members before they can be moved back into the apparatus on the return chain run, and there cause possible damage to the apparatus.

Figure 11:
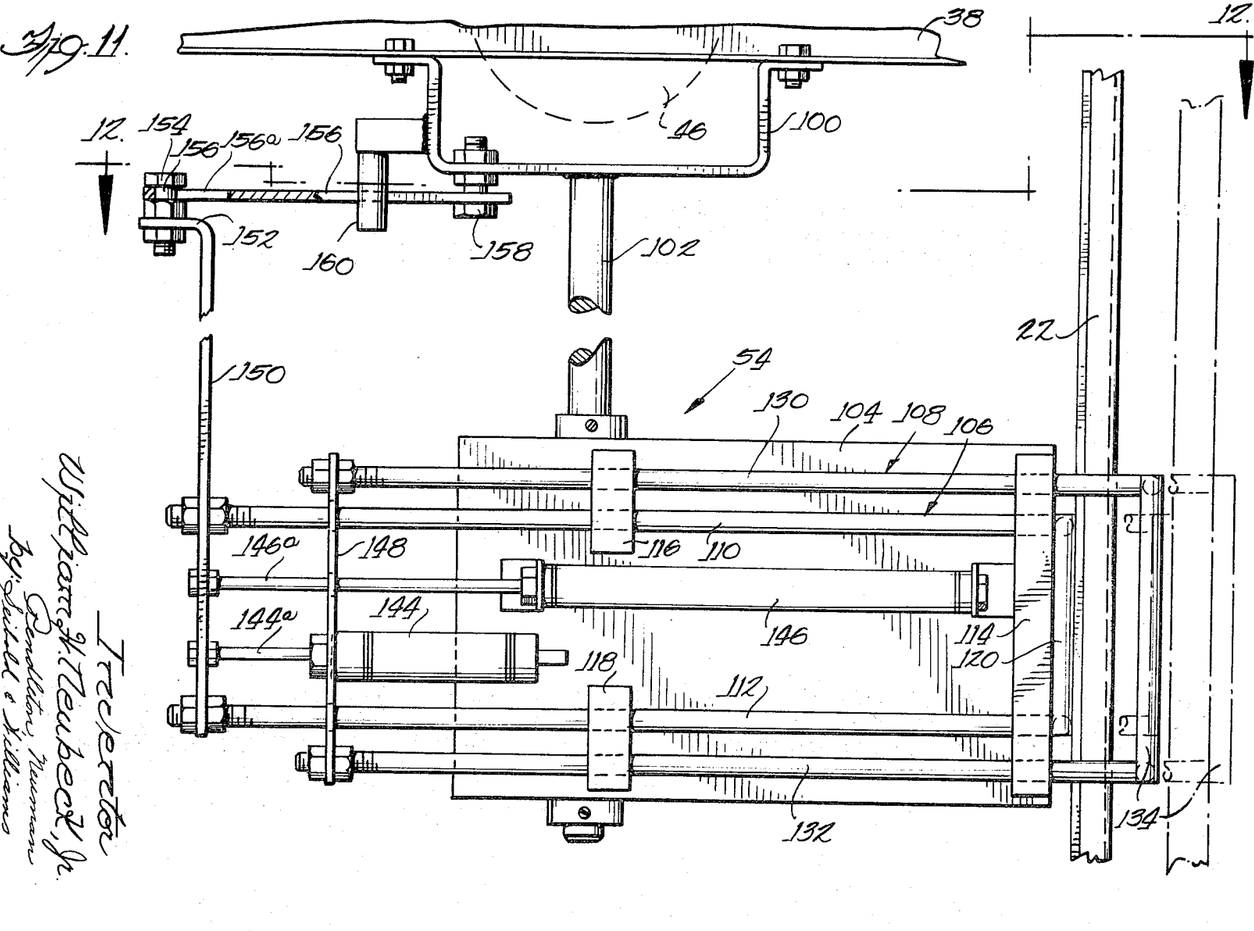
FIG. 11 is an enlarged side elevation of the preferred form of mechanism for disengaging the hanger member from the second conveyor member.

It is preferred that there be means for not only disengaging the hanger members 22 from the conveyor 26 but for transporting these hanger members to a position remote from this conveyor so that they will not interfere with or tend to damage the product strands 18. The preferred mechanism for accomplishing this is illustrated in FIGS. 11–15. FIG. 11 is a side elevational view of the mechanism 54, and it may be seen that this mechanism is located below and extends forwardly of the drive sprocket 36 for the right hand endless chain 32 (see FIG. 1). Affixed to the frame 38 of the apparatus is a support 100 having a vertical shaft 102 depending therefrom, and a subframe 104 is pivotally mounted on the lower end of this shaft 102. A pair of jaw members 106 and 108 are slidably mounted on the subframe for relative movement with respect to one another and with respect to the subframe.

Figure 13:
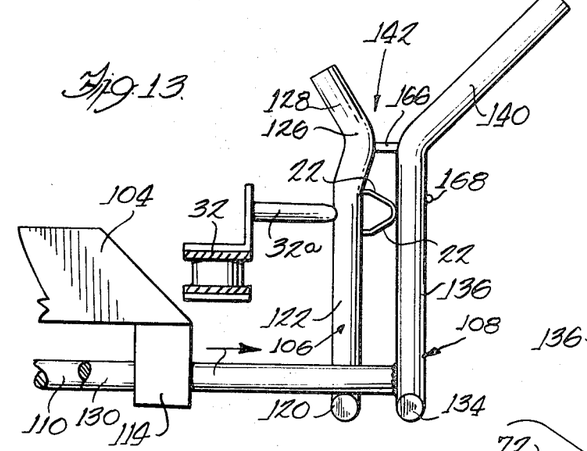
FIG. 13 is an enlarged top plan view of the jaws of the second disengaging mechanism in gripping engagement with a hanger member.
Figure 14:
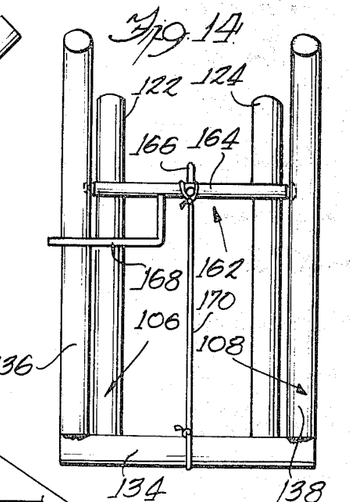
FIG. 14 is an enlarged end elevational view of the jaws of the second disengaging mechanism.

The inner jaw member 106 has a pair of parallel operating rods 110 and 112, these operating rods being slidably mounted in a front guide block 114 and in rearward guide blocks 116 and 118 respectively. The forward ends of the operating rods 110 and 112 are connected by a vertical connecting bar 120, and a pair of jaw bars 122 and 124 extend horizontally inwardly from the vertical bar 120, as best illustrated in FIGS. 13 and 14. Each of these jaw bars 122 and 124 has a double bend portion adjacent its free end providing a knee portion 126 which extends slightly forwardly and an inner end portion 128 which extends slightly rearwardly.

Figure 12:
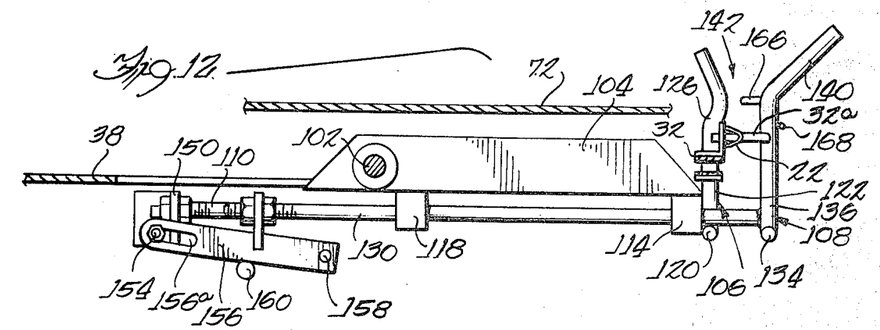
FIG. 12 is a top plan view of the second disengaging mechanism illustrated in FIG. 11 in its initial retracted position.

The outer jaw member 108 also has a pair of operating rods 130 and 132 which are slidably mounted in the front guide block 114 and in the rear guide blocks 116 and 118 respectively of the subframe 104. Forwardly of the front guide block 114 and of the forward portions of the jaw member 106 is a vertical connecting bar 134, and a pair of spaced parallel jaw bars 136 and 138 extend horizontally inwardly therefrom as best illustrated in FIGS. 13 and 14. Each of the jaw bars 136 and 138 has an inner end portion 140 which extends forwardly as best illustrated in FIGS. 12 and 13. The combination of the inner end portions 128 and 140 results in a flaring mouth 142 into which the hanger member 22 is adapted to swing in its movement from its horizontal position to its vertical position.

In order to effect movement of the jaws with respect to each other and with respect to the subframe 104, a pair of fluid cylinders 144 and 146 are provided as best illustrated in FIG. 11. The fluid cylinder 144 is connected to a first or outer jaw connecting plate 148, so called because the rearward end portions of the operating rods 130 and 132 of the outer jaw member 108 are also connected to this connecting plate 148. The operating rods 110 and 112 of the inner jaw member 106 are connected to a second or inner jaw connecting plate 150, and the piston rod 144a of the fluid cylinder 144 is also connected to this inner jaw connecting plate 150. Thus the operation of the cylinder 144 and the reciprocation of the piston rod 144a results in the relative reciprocal opening and closing movement of the inner and outer jaw members 106 and 108.

The fluid cylinder 146 is affixed to the subframe 104, and the piston rod 146a of the fluid cylinder 146 is connected to the second or inner jaw connecting plate 150. Thus, the operation of the fluid cylinder 146 effects movement of the inner jaw member 106 with respect to the subframe 104. Since the inner jaw member 106 is connected to the outer jaw member 108 by means of the fluid cylinder 144 and the piston rod 144a, movement of the piston rod 146a of the fluid cylinder 146 will effect movement of both of the jaw members 106 and 108 relative to the subframe 104. To avoid torque it is preferred that the jaw member operating rods and the piston rods be located in the same plane. For this reason the operating rods 110 and 112 and the piston rod 146a extend through apertures in the first connecting plate 148.

Means is provided for rotating the subframe 104 as the jaw members 106 and 108 are moved outwardly. For this purpose the inner end 152 of the connecting plate 150 carries a slide fastener 154, the shank portion 154a of which is disposed within a slot 156a of the arm 156. The other end of the arm 156 is pivotally connected by means of a pivotal connector 158 to the support member 100 which is affixed to the frame. A pin 160 also affixed to the support 100 is disposed for engagement by the arm 156 to limit the counterclockwise rotation of the arm about the pivotal connector 158. As may be seen from FIG. 12 the pivotal connector 158 is disposed outwardly from and to the rear of the axis of the vertical shaft 102 about which the subframe 104 is adapted to pivot. The axis of the pivotal connector 158 (which is the pivotal axis of the arm 156) is in spaced parallel relation with respect to the axis of the shaft 102 (which is the pivotal axis of the subframe 104), and the operating rods 110 and 112 of the inner jaw member and 130 and 132 of the outer jaw member are movable in a plane intermediate these two parallel axes.

When the connecting plate 150 is moved to the left as viewed in FIGS. 11 and 12 by the actuating of the fluid cylinder 146 and the movement of the piston rod 146a to the right, the jaw members 106 and 108 will move outwardly with respect to the subframe 104. However, because of the lost motion connection of the slide fastener 154 in the slot 156a, there will be no rotation of the subframe with respect to the frame 38 until the slide fastener 154 reaches the inner end of the slot 156a in the arm 156. Once the slide fastener does reach the inner end of the slot 156a, further movement of the piston rod 146a to the right will cause the rotation of the arm 156 in the clockwise direction as viewed in FIGS. 12 and 13, thereby causing the subframe 104 to rotate about the axis of shaft 102 to and through the position illustrated in FIG. 15.

When the piston rod 146a is extended as in FIGS. 11 and 12, the subframe 104 will be in its normal position ready to receive a hanger member 22 between the transverse jaw bars of the jaw members 106 and 108. When the piston rod 146a is retracted, it will first move the jaw members 106 and 108 outwardly (see FIG. 13), and then it will effect pivotal movement of the subframe to swing the jaws away from the conveyor 24.

As previously stated the mouth 142 between the jaw bars of the jaw members 106 and 108 is flared so that it may readily receive the hanger member 22 as the hanger member swings downwardly from its horizontal position to its vertical position. The flared mouth 142 of the jaw bars assures initial entry of the hanger member 22 into the space between the jaw bars, and, of course, the hanger member must remain in place between the jaw bars until the jaw bars are moved together to grip the hanger member therebetween.

To assure this it is preferred that a trap or hanger member retention means 162 be provided. This trap is best illustrated in FIGS. 13 and 14 and comprises a vertical spindle 164, the ends of which are journaled in the horizontal bars 136 and 138 forming the gripping portions of the outer jaw member 108. A first arm or gate arm 166 is affixed to and extends radially outwardly therefrom. In its normal position the gate arm 166 extends transversely with respect to the bars 136 and 138 of the outer jaw, toward the bars 122 and 124 forming the gripping portions of the inner jaw member. Thus the gate arm 166 normally closes the mouth 142 of the jaws. A second arm or stop arm 168 is also affixed to and extends outwardly from the spindle 164. This stop arm 168 engages the horizontal bar 136 and prevents rotation of the spindle in the clockwise direction from its normal position as viewed in FIGS. 12 and 13. A resilient member or spring 170 resiliently resists the rotation of the spindle and the arms 166 and 168 in the counterclockwise direction as viewed in FIGS. 12 and 13. The resilience of the spring 170, however, is very light, and as a hanger member 22 swings downwardly into position between the jaws, it will engage the gate arm 166 and rotate it in the counterclockwise direction against the resilience of the spring 170. After the hanger member has passed the gate arm 166, the gate arm is returned to its initial mouth-closing position by the spring 170 as shown in FIGS. 12 and 13, and it is not possible thereafter for the hanger member 22 to move outwardly past the gate arm since the gate arm will not rotate in the clockwise direction from its normal mouth-closing position.

The fluid cylinders 144 and 146 are both operated by means of a solenoid valve 172 having an arm 172a adapted for engagement with a pin 32a on the right hand conveyor member 28 as that pin reaches a horizontal position. The solenoid valve and arm are illustrated in FIGS. 1 and 2. When the fluid cylinders 144 and 146 are actuated, the piston rods 144a and 146a both move to the right as viewed in FIG. 11. Since the fluid cylinder 144 is a smaller and shorter cylinder, it will be actuated more quickly to effect closing of the jaws on the hanger member disposed therebetween. Almost simultaneously the jaws will be both moved to the right in FIG. 11 by the movement of the piston rod 146a to the right. Thus, as a first consequence the actuation of the fluid cylinders 144 and 146, the jaws will close and move outwardly, thus gripping the hanger member 22 therebetween and moving it off of the pin 32a on the right hand conveyor member 28.

Figure 15:
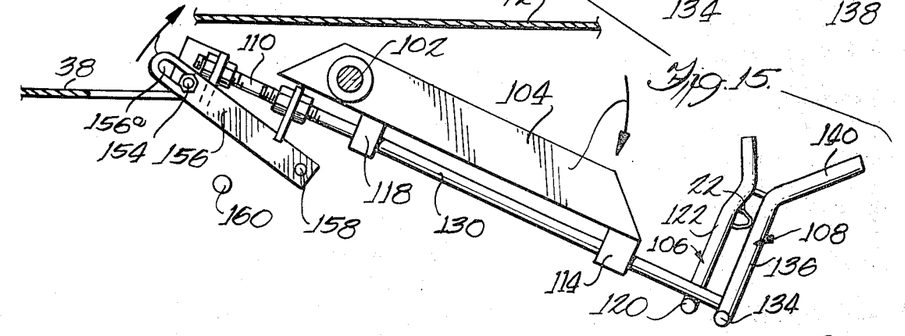
FIG. 15 is a top plan view of the second disengaging mechanism of FIG. 11 after it has gripped the hanger member and as it is swinging the hanger member outwardly away from the conveyor members.

As the connecting plate 150 is moved to the right the slide fastener 154 engages the right hand end of the slot 156a in the arm 156, and then the arm 156 will be caused to rotate about its axis 158, causing simultaneous rotation of the subframe 104 until the position illustrated in FIG. 15 has been reached or passed, and at this point the pin 32a engaging the arm 172a of the solenoid valve 172 will become disengaged to de-energize the fluid cylinders 144 and 146. Again, because the cylinder 144 is smaller than the cylinder 146, the piston rod 144a will move first to effect opening of the jaws, thereby dropping the previously gripped hanger member 22, preferably into an awaiting receptacle (not shown). This opening of the jaws and release of the hanger member 22 is immediately followed by return of the piston rod 146a to its extended position causing the return clockwise rotation of the subframe 104 and the return movement of the jaws to the position illustrated in FIGS. 11 and 12. In this position the mechanism 54 is ready for receiving another one of the hanger members 22 as it swings downwardly into its vertical position.

In brief summary of the operation of the apparatus, the strands of linked sausage or other material are looped over the hanger bars 22 and move along on the hanger bars between the conveyor members 26 and 28. Just before reaching the end of the conveyor run, the pusher mechanism 50 is actuated causing the pusher plate 56 to move inwardly from the right hand wall of the apparatus and push the product away from the conveyor member 28 and toward the conveyor member 26. Then as the hanger bar with the product pushed slightly to the side of the conveyor 26 moves about the end sprocket 36, the first disengaging mechanism 52 will be actuated to force the end of the hanger bar 22 off of the pin 30a of the conveyor 26. The hanger bar will then swing downwardly, and the strands of linked sausages 18 will then fall into the chute 48. The hanger member continues to swing downwardly about the axis of its remaining connecting pin 32a on the conveyor member 28 entering the mouth 142 between the jaws 106 and 108 and through the gate 166. The second disengaging mechanism 54 is then actuated to close the jaws upon the trapped vertically disposed hanger member 22, gripping it and moving it off of the pin 32a of the conveyor member 28 and then swinging it outwardly to a predetermined position where the jaws will open to release the hanger member in the return movement of the mechanism 54 to its initial position. It may be seen that the invention provides for the automatic unloading of the product and hanger members from the conveyor in a very novel manner, permitting the conveyor to operate at high speeds and permitting the rapid and sure separation of the product strands 18 from the hanger members 22.

The actuation of each of the mechanisms has been described as being controlled by solenoid valves having switch arms which are actuated by the pins on the conveyors. It will be apparent that any suitable and well known timing mechanism may be employed for this purpose. For example, a cam actuation may be employed for the operation of the valves controlling the fluid cylinders. If solenoid valves actuated by the pins or other portions of the conveyor chains 30 and 32 are employed, these could be located remote from the mechanisms which they control inasmuch as the timing of the various mechanisms may be taken at any place along the conveyor chains or at any of the sprockets operated by the chain.

It is to be understood that the present disclosure has been made only by way of example and that many additional modifications, changes, and various details may be resorted to without departing from the spirit and scope of the invention as hereinafter claimed.

What is claimed is:

1. In a machine for transporting lengths of a product strand such as linked sausages or the like along a predetermined path, a plurality of hanger members, each when horizontally disposed being adapted to support a product strand draped thereover and depending therefrom, a pair of spaced parallel conveyor members, means releasably connecting one end of each of said hanger members to one of said conveyor members and releasably and pivotally connecting the other end of each of said hanger members to the other of said conveyor members, means for disengaging each hanger member from said one conveyor member as that hanger member reaches a predetermined location, whereby said hanger member will remain connected to said other conveyor member and may swing downwardly from a substantially horizontal position to a downwardly depending position permitting the product to fall therefrom, and means for disengaging said hanger member from the other of said conveyor members after the product has been discharged and said hanger member has reached its downwardly depending position.

2. The structure of claim 1 wherein said means for disengaging said hanger members from said other conveyor includes means for gripping said hanger members and transporting them to a location remote from said conveyor members.

3. The structure of claim 1 wherein each of said conveyor members and said hanger members are connected by means of a pin mounted on one of said members, the other of said members having a pin-receiving aperture, whereby said members may be disengaged by forcing the members apart.

4. The structure of claim 1 wherein each of said conveyor members has an endless chain, each chain carrying a plurality of spaced pins, and said hanger members are bars having their ends apertured, whereby the bars may be mounted on and carried by the corresponding pins on said conveyor member chains, and means is provided for driving said chains at the same speed.

5. The structure of claim 4 wherein said pins are uniformly spaced and extend radially outwardly from the periphery of each of said conveyor member chains.

6. The structure of claim 1 including means forcing the product on said hanger members away from said other conveyor member and toward said one conveyor member prior to the disengagement of the hanger member from said one conveyor member.

7. The structure of claim 6 wherein said means for forcing the product on said hanger members away from said other conveyor member includes a pusher member mounted adjacent said other conveyor member for movement toward and away from said one conveyor member, and means for effecting movement of said pusher member toward said one conveyor when a hanger member with product thereon is moved to a position substantially above said pusher member, whereby the product will be forced toward said one conveyor member.

8. The structure of claim 1 wherein said pusher member includes a product-engaging element mounted for movement below the path of said hanger members and in a direction substantially parallel to said hanger members as each is moved to a position substantially above said product-engaging element.

9. The structure of claim 1 wherein said means for disengaging each hanger member from said one conveyor member includes an element mounted for movement into engagement with each hanger member to force said hanger member away from and out of engagement with said one conveyor member when said hanger member reaches its predetermined location.

10. The structure of claim 1 wherein said means for disengaging each hanger member from said one conveyor member includes an element mounted adjacent said one conveyor member for movement between a first position and a second position through the space occupied by each hanger member when that member is in said predetermined location, said element when in said first position being out of the path of said hanger members in their movement toward said predetermined location, and means for effecting movement of said element from its first to its second position when a hanger member has been moved to said predetermined location, whereby the hanger member may be forcibly disengaged from said one conveyor member.

11. The structure of claim 10 wherein when said element is in said first position a portion of said element extends outwardly from between said conveyor members to contact and disengage said hanger members from said one conveyor member in the event that any of said hanger members remain attached to said one conveyor member after passing said predetermined location.

12. The structure of claim 10 wherein means is provided for pivotally mounting said element adjacent said one conveyor member.

13. The structure of claim 10 wherein said element is mounted for pivotal movement about a substantially horizontal axis.

14. The structure of claim 10 wherein said element has a convex leading edge portion for engaging said hanger members and is pivotally mounted for movement about a substantially horizontal axis between said first and second positions.

15. The structure of claim 10 wherein said element includes a shaft mounted for horizontal axial rotation, a hanger member engaging piece being fixed to said shaft, and an operating arm fixed to said shaft; and said means for effecting movement of said element is a reciprocally movable power means for moving said operating arm in one direction as a hanger member is moved to said predetermined location, whereby said element may be moved from said first to said second position to effect disengagement of said hanger member from said one conveyor.

16. The structure of claim 2 wherein said conveyor members and said hanger members have interengaging formations; and said means for disengaging the hanger member from said other conveyor and transporting it to a remote location includes means for grasping said hanger member in its downwardly depending position, and means for moving said hanger member first in one direction to effect disengagement of said interengaging formations and then in another direction to a location remote from said conveyors, said hanger member being released by said grasping means in said remote location.

17. The structure of claim 2 wherein said means for disengaging said hanger member from said other conveyor member includes a pair of jaws normally open to receive a hanger member as the hanger member swings to a substantially vertical position, first power means operable in one direction for closing said jaws when a hanger member has reacted its substantially vertical position, and second power means operable in one direction for moving the gripped hanger member out of engagement with said other conveyor member and to a location remote from said other conveyor member, said first and second power means being operable in their respective opposite directions after said hanger member has been moved to a location remote from said other conveyor member for releasing said hanger member in said location and for returning said jaws to their normally open position adjacent said other conveyor member.

18. The structure of claim 2 wherein said means for gripping said hanger members and transporting them to a location remote from said conveyor members includes first and second jaws, first power means operable in one direction to effect opening of said jaws, and operable in the opposite direction to effect closing of said jaws, second power means operable in one direction to effect movement of said jaws from an initial location adjacent said other conveyor member to a location away from said other conveyor member and operable in the opposite direction to effect return movement of said jaws to said initial location, and means for operating said first and second power means in said one direction to close said jaws upon and grip said hanger member and to move said jaws with said hanger member to said remote location and for then operating said first and second power means in said opposite direction to open said jaws releasing said hanger member and to return said jaws to said initial location.

19. The structure of claim 1 wherein said machine includes a fixed frame; and said means for disengaging said hanger member from the other of said conveyor members includes a subframe pivotally mounted on said frame, first and second jaws mounted for movement toward and away from each other and toward and away from the pivotal axis of said subframe, first power means operatively connected to said jaws to effect opening and closing movement of said jaws, second power means operatively connected to said frame and to one of said jaws and operable in one direction to effect movement of said jaws outwardly from the pivotal axis of said subframe and to effect subsequent pivotal movement of the free end of said subframe away from said frame, said second power means being operable in the opposite direction to effect return movement of said jaws and said subframe to their initial positions.

20. The structure of claim 19 wherein said subframe is pivotally connected to said frame for movement about a horizontal axis and said jaws have operating elements which are slidably mounted on said subframe for reciprocal parallel movement with respect to one another, said first power means being connected between said operating elements, and said second power means being connected to one of said operating elements and to said frame.

21. The structure of claim 19 and including subframe rotating means responsive to said second power means to effect rotation of said subframe as said jaws are moved relative to said subframe toward and away from the pivotal axis of said subframe.

22. The structure of claim 21 wherein said subframe rotating means includes a lever arm mounted for pivotal movement with respect to the frame about an axis spaced from and parallel to the axis of said subframe, and means connecting the free end of said lever arm to the operating element of one of said jaws, whereby said subframe may be rotated as said one jaw is moved relative to said subframe.

23. The structure of claim 22 wherein the means connecting the lever arm to the operating element of one of said jaws is a lost motion connection means, whereby said one jaw may move a predetermined distance relative to said subframe before causing rotation of said subframe.

24. The structure of claim 23 wherein said lost motion connection means includes a longitudinal slot in said lever arm adjacent the free end thereof and a slide fastener carried by said jaw operating element and having a portion thereof disposed for sliding movement within said lever arm slot.

25. The structure of claim 24 wherein said second power means includes an operating rod reciprocally movable in a plane intermediate the pivotal axis of said subframe and said lever arm.

26. The structure of claim 24 wherein said second power means includes a fluid cylinder having a reciprocally movable piston rod; and there is provided valve means controlling the application of fluid pressure to said cylinder, and means operating said valve in predetermined synchronism with said conveyor members.

27. The structure of claim 26 wherein said first power means includes a fluid cylinder smaller in size than the fluid cylinder of said second power means, said first power means cylinder having a reciprocally movable piston rod, said valve means controlling the application of fluid pressure simultaneously to the fluid cylinders of said first and second power means.

28. The structure of claim 17 wherein said jaws have a flared mouth for facilitating receipt of the hanger member between said jaws as the latter swings to its substantially vertical position.

29. The structure of claim 17 and further including means for trapping said hanger member between said jaws when said jaws are in said open position.

30. The structure of claim 29 wherein said means for trapping said hanger member includes a gate element mounted on one of said jaws for pivotal movement between a closed position at least partially traversing the opening between said jaws and an inwardly swung open position, stop means preventing the pivotal movement of said gate member outwardly from its closed position, and resilient means urging said element toward its closed position, whereby said gate element will be pivoted to its open position by a hanger member entering the space between the jaws and then will be returned to its closed position by said resilient means to retain the hanger member in position between said jaws.

31. In a machine for transporting lengths of a product strand such as linked sausages or the like along a predetermined path, a plurality of product-supporting hanger members, a pair of spaced parallel conveyor members, means releasably connecting each end of each hanger member to a respective one of said conveyor members, means for disengaging each hanger member from said one conveyor member as that hanger member reaches a predetermined location, whereby the product may be discharged from the disengaged end of said hanger member, and means for disengaging said hanger member from the other of said conveyor members after the product has been discharged from said hanger member.

32. A machine for transporting lengths of a product such as linked sausages or the like, said machine comprising first and second conveyor members, each having an end sprocket and a conveyor chain extending around said sprocket, said first conveyor chain carrying a plurality of uniformly spaced, radially extending first pins and said second conveyor chain carrying a plurality of identically spaced, radially extending second pins, means for driving said first and second conveyor chains in synchronization with said first and second pins transversely aligned, a plurality of hanger members each having end apertures and being mounted across said conveyors with corresponding first and second pins extending through the end apertures, means adjacent the end sprocket of said first conveyor member chain for moving the apertured end of each hanger member off its first pin as the first and second pins holding that hanger member reach a predetermined position in their movement about said end sprockets, whereby the hanger member may be disengaged from its first conveyor pin and the bar may swing from a substantially horizontal position to a substantially vertical position about the axis of said second pin permitting the product to fall therefrom, and means adjacent said second conveyor chain for gripping each hanger member in its substantially vertical position and moving it first off of its second pin and then to a location remote from said conveyors and for releasing the hanger member in said remote location, whereby said hanger members may be separated from the product.

References Cited
UNITED STATES PATENTS

| | | | |
|---|---|---|---|
| 222,821 | 12/1879 | Hawley | 34—157 |
| 2,102,453 | 12/1937 | Beniver et al. | 226—104 |
| 2,223,352 | 12/1940 | Francisci | 226—107 XR |

ALLEN N. KNOWLES, Primary Examiner

G. A. CHURCH, Assistant Examiner

U.S. Cl. X.R.

226—107

PO-1050
(5/69)

UNITED STATES PATENT OFFICE
CERTIFICATE OF CORRECTION

Patent No. 3,533,545               Dated   October 13, 1970

Inventor(s)   William H. Neubeck, Jr.

It is certified that error appears in the above-identified patent and that said Letters Patent are hereby corrected as shown below:

Col. 1, line 38, "mechanism" should be --mechanisms--

Col. 11, line 52, in claim 17, "reacted" should be --reached--

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents